(12) United States Patent
Ishii et al.

(10) Patent No.: US 10,901,742 B2
(45) Date of Patent: Jan. 26, 2021

(54) APPARATUS AND METHOD FOR MAKING PREDICTIONS FOR INSTRUCTION FLOW CHANGING INSTRUCTIONS

(71) Applicant: Arm Limited, Cambridge (GB)

(72) Inventors: Yasuo Ishii, Austin, TX (US); Muhammad Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 109 days.

(21) Appl. No.: 16/364,570

(22) Filed: Mar. 26, 2019

(65) Prior Publication Data

US 2020/0310812 A1 Oct. 1, 2020

(51) Int. Cl.
*G06F 9/38* (2018.01)
*G06F 9/30* (2018.01)

(52) U.S. Cl.
CPC ........ *G06F 9/3806* (2013.01); *G06F 9/30054* (2013.01); *G06F 9/30058* (2013.01);
(Continued)

(58) Field of Classification Search
CPC ..... G06F 9/3806; G06F 9/3005; G06F 9/3802
See application file for complete search history.

(56) References Cited

U.S. PATENT DOCUMENTS

| | | | | | |
|---|---|---|---|---|---|
| 2001/0004747 | A1* | 6/2001 | Koehler | ................ | G06F 9/3877 710/48 |
| 2006/0095745 | A1* | 5/2006 | Tran | ...................... | G06F 9/3824 712/238 |

(Continued)

OTHER PUBLICATIONS

U.S. Appl. No. 16/364,557, filed Mar. 26, 2019, Ishii et al.
Office Action dated Nov. 10, 2020 for U.S. Appl. No. 16/364,557, 25 pages.

*Primary Examiner* — Zachary K Huson
(74) *Attorney, Agent, or Firm* — Nixon & Vanderhye P.C.

(57) ABSTRACT

An apparatus and method are provided for making predictions for instruction flow changing instructions. The apparatus has a fetch queue that identifies a sequence of instructions to be fetched for execution by execution circuitry, and prediction circuitry for making predictions in respect of instruction flow changing instructions, and for controlling which instructions are identified in the fetch queue in dependence on the predictions. The prediction circuitry is arranged, during each prediction iteration, to make a prediction for a predict block comprising a sequence of M instruction addresses, in order to identify whether that predict block contains the instruction address for an instruction flow changing instruction that is predicted as taken. During each prediction iteration, the prediction circuitry is arranged by default to access a prediction storage in order to produce prediction information for instructions associated with a specified block of instruction addresses (including at least the predict block being considered), and to use that prediction information to make the prediction for the predict block. Buffer storage is used to retain the prediction information obtained from the prediction storage during one or more previous prediction iterations, and detection circuitry is used to detect when a current predict block being considered during a current prediction iteration comprises one or more instruction addresses for which the associated prediction information is retained in the buffer storage. In that event, the above default behaviour is not adopted, and an override condition is triggered to cause the prediction information for those one or more instruction addresses to be obtained from the buffer storage rather than from the prediction storage, giving rise to a power saving.

18 Claims, 14 Drawing Sheets

(52) U.S. Cl.
CPC ............ *G06F 9/381* (2013.01); *G06F 9/3814* (2013.01); *G06F 9/3844* (2013.01); *G06F 9/3005* (2013.01); *G06F 9/3802* (2013.01)

(56) References Cited

U.S. PATENT DOCUMENTS

2013/0339695 A1\* 12/2013 Bonanno ............ G06F 9/30047
712/239
2019/0369999 A1\* 12/2019 Evers .................. G06F 9/30058
2020/0004543 A1\* 1/2020 Kumar .................. G06F 9/3806

\* cited by examiner

APPARATUS AND METHOD FOR MAKING PREDICTIONS FOR INSTRUCTION FLOW CHANGING INSTRUCTIONS

BACKGROUND

The present technique relates to an apparatus and method for making predictions for instruction flow changing instructions.

Within a data processing apparatus, execution circuitry may be provided for executing instructions. A fetch queue may be provided to identify instructions to be fetched from memory for execution by the execution circuitry.

Typically, instructions from sequential addresses in memory will be executed until an instruction flow changing instruction is encountered. In particular, execution of such an instruction flow changing instruction may cause a discontiguous change in the address, such that the next instruction executed after the instruction flow changing instruction is at a target address determined for the instruction flow changing instruction, rather than the immediately following instruction within the instruction address space. In order to seek to ensure that the fetch queue identifies the instructions that actually require execution by the execution circuitry, it is known to provide prediction circuitry to make predictions in respect of such instruction flow changing instructions, for example to identify whether those instructions will be taken or not taken, and, if those instructions are taken, to predict the target address of the next instruction to be executed. The predictions made by the prediction circuitry can then be used to control which instructions are identified in the fetch queue.

The prediction circuitry can consume significant power, and hence increase the overall power consumption of the apparatus incorporating such prediction circuitry. It would be desirable to reduce the power consumption of the prediction circuitry.

SUMMARY

In one example arrangement, there is provided an apparatus comprising: a fetch queue to identify a sequence of instructions to be fetched for execution by execution circuitry; and prediction circuitry to make predictions in respect of instruction flow changing instructions, and to control which instructions are identified in the fetch queue in dependence on the predictions; wherein: the prediction circuitry is arranged, during each prediction iteration, to make a prediction for a predict block comprising a sequence of M instruction addresses, in order to identify whether that predict block contains the instruction address for an instruction flow changing instruction that is predicted as taken; during each prediction iteration, the prediction circuitry is arranged, in the absence of an override condition, to access a prediction storage in order to produce prediction information for instructions associated with a specified block of instruction addresses, where the specified block comprises at least the predict block being considered during that prediction iteration, and to use that prediction information to make the prediction for that predict block; the apparatus further comprising: buffer storage to retain the prediction information obtained from the prediction storage during one or more previous prediction iterations; and detection circuitry to detect when a current predict block being considered during a current prediction iteration comprises one or more instruction addresses for which the associated prediction information is retained in the buffer storage, and in that event to trigger the override condition in order to cause the prediction information for those one or more instruction addresses to be obtained from the buffer storage rather than from the prediction storage.

In another example arrangement, there is provided a method of making predictions for instruction flow changing instructions, comprising: identifying within a fetch queue a sequence of instructions to be fetched for execution by execution circuitry; employing prediction circuitry to make predictions in respect of instruction flow changing instructions, and to control which instructions are identified in the fetch queue in dependence on the predictions; during each prediction iteration, making a prediction for a predict block comprising a sequence of M instruction addresses, in order to identify whether that predict block contains the instruction address for an instruction flow changing instruction that is predicted as taken; during each prediction iteration, in the absence of an override condition, accessing a prediction storage in order to produce prediction information for instructions associated with a specified block of instruction addresses, where the specified block comprises at least the predict block being considered during that prediction iteration, and using that prediction information to make the prediction for that predict block; employing buffer storage to retain the prediction information obtained from the prediction storage during one or more previous prediction iterations; and detecting when a current predict block being considered during a current prediction iteration comprises one or more instruction addresses for which the associated prediction information is retained in the buffer storage, and in that event triggering the override condition in order to cause the prediction information for those one or more instruction addresses to be obtained from the buffer storage rather than from the prediction storage.

In a still further example arrangement, there is provided an apparatus comprising: fetch queue means for identifying a sequence of instructions to be fetched for execution by execution circuitry; and prediction means for making predictions in respect of instruction flow changing instructions, and for controlling which instructions are identified in the fetch queue means in dependence on the predictions; wherein: the prediction means, during each prediction iteration, for making a prediction for a predict block comprising a sequence of M instruction addresses, in order to identify whether that predict block contains the instruction address for an instruction flow changing instruction that is predicted as taken; during each prediction iteration, the prediction means, in the absence of an override condition, for accessing a prediction storage in order to produce prediction information for instructions associated with a specified block of instruction addresses, where the specified block comprises at least the predict block being considered during that prediction iteration, and for using that prediction information to make the prediction for that predict block; the apparatus further comprising: buffer means for retaining the prediction information obtained from the prediction storage during one or more previous prediction iterations; and detection means for detecting when a current predict block being considered during a current prediction iteration comprises one or more instruction addresses for which the associated prediction information is retained in the buffer means, and in that event for triggering the override condition in order to cause the prediction information for those one or more instruction addresses to be obtained from the buffer means rather than from the prediction storage.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
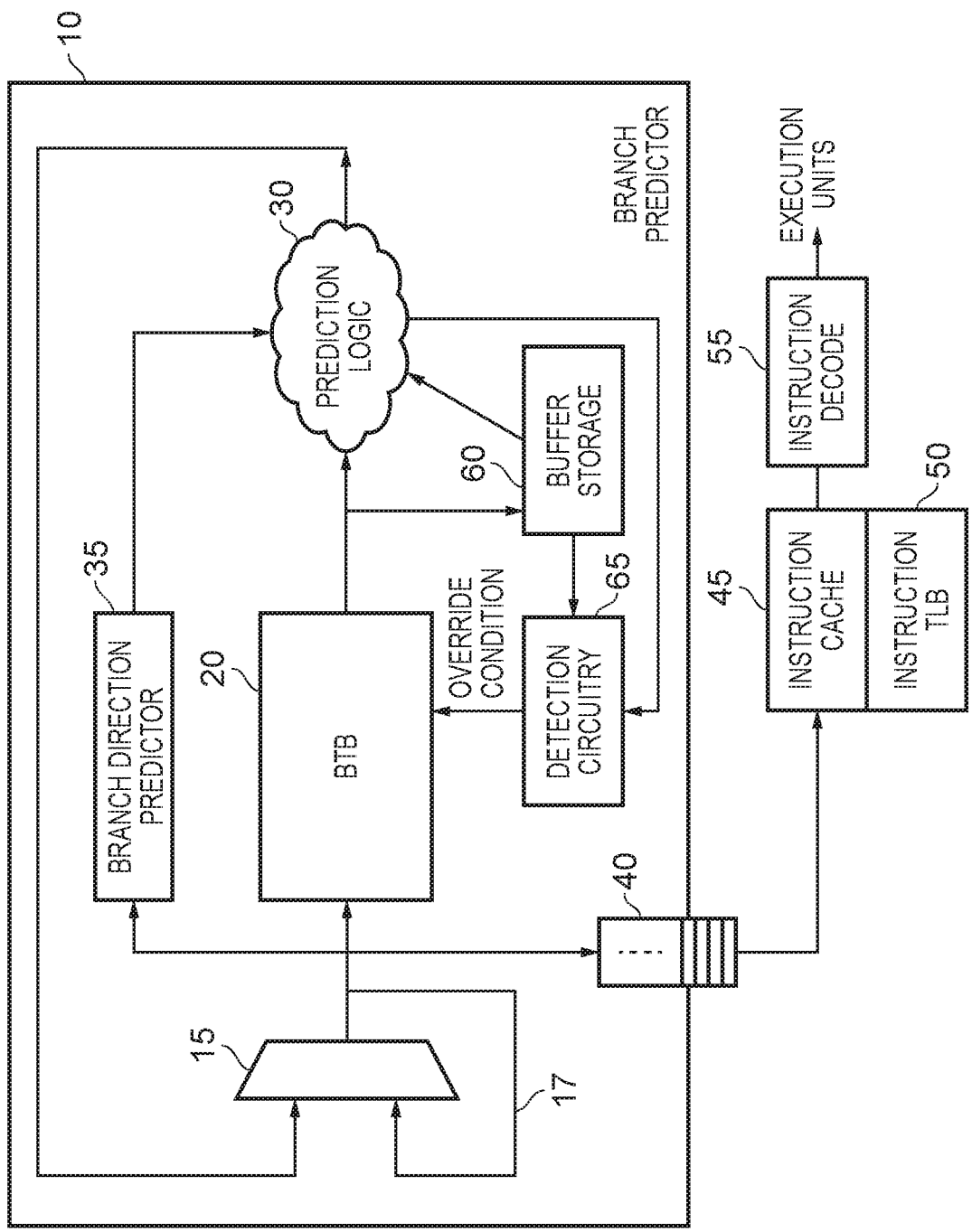
FIG. 1 is a block diagram of an apparatus in accordance with one example implementation.

As mentioned earlier, it would be desirable to reduce the power consumption associated with the prediction circuitry within a data processing apparatus. A significant proportion of that power consumption results from the need to access one or more prediction storage structures during each prediction iteration in order to produce prediction information that is then used to make the predictions in respect of instruction flow changing instructions. In accordance with the techniques described herein, a mechanism is provided that enables prediction information to be retained for a number of prediction iterations, and to then detect situations where that prediction information can be re-used without needing to re-access the prediction storage, thereby enabling a reduction in power consumption.

In accordance with the techniques described herein an apparatus is provided that has a fetch queue for identifying a sequence of instructions to be fetched for execution by execution circuitry. Prediction circuitry is also provided for making predictions in respect of instruction flow changing instructions, and for controlling which instructions are identified in the fetch queue in dependence on the predictions. The prediction circuitry is arranged such that, during each prediction iteration, it makes a prediction for a predict block comprising a sequence of M instruction addresses, in order to identify whether that predict block contains the instruction address for an instruction flow changing instruction that is predicted as taken.

Hence, during each prediction iteration, the prediction circuitry analyses a sequence of instruction addresses, and hence can seek to identify the first instruction address in that sequence, if any, that corresponds to an instruction flow changing instruction that is predicted as taken. When such an instruction flow changing instruction is found, then the next predict block that will need to be considered during the next prediction iteration has a start address that is determined by the target address of that instruction flow changing instruction. In the absence of such an instruction flow changing instruction being found, then the next predict block has a start address immediately following the last address of the currently considered predict block.

By default, during each prediction iteration, the prediction circuitry will access a prediction storage in order to produce prediction information for instructions associated with a specified block of instruction addresses. The specified block can take a variety of forms, but will comprise at least the predict block being considered during that prediction iteration. The prediction information obtained from the prediction storage is used to make the prediction for the currently considered predict block.

In accordance with the techniques described herein the apparatus further has buffer storage to retain the prediction information obtained from the prediction storage during one or more previous prediction iterations. The buffer storage can be arranged in a variety of ways, but could for example take the form of a pipelined structure, so that prediction information obtained from the prediction storage is passed through the pipeline stages of the buffer storage over a number of prediction iterations, such that at any particular point in time the prediction information obtained during the most recent preceding X prediction iterations will be retained, where X is the number of pipeline stages in the buffer storage.

Further, detection circuitry is provided to detect when a current predict block being considered during a current prediction iteration comprises one or more instruction addresses for which the associated prediction information is retained in the buffer storage. In that event, the detection circuitry triggers an override condition which causes the prediction circuitry to depart from the default behaviour discussed above. Instead, in the presence of the override condition, this causes the prediction information for those one or more instruction addresses to be obtained from the buffer storage rather than from the prediction storage. This reduces the extent to which the prediction storage needs to be accessed, and hence can reduce power consumption.

In one example implementation, in the presence of the override condition, at least a portion of the prediction storage is deactivated during the current prediction iteration. In particular, that portion of the prediction storage can be deactivated that would otherwise have been accessed to obtain the prediction information that is instead going to be obtained from the buffer storage.

In some instances, this can avoid the need to access the prediction storage at all during the current prediction iteration. In particular, when the current predict block is entirely contained within a specified block of instruction addresses for which the associated prediction information is retained within the buffer storage, then the prediction circuitry is arranged to make the prediction for the current predict block without accessing the prediction storage. In such instances, this increases the power consumption savings that can be realised.

The prediction storage can take a variety of forms, but in one example implementation is target prediction storage and the prediction information indicates a predicted target address for any instruction flow changing instructions that are associated with the specified block of instruction addresses. Hence, the target prediction storage can be used to identify any instruction flow changing instructions within the specified block, and can provide information sufficient to enable a predicted target address for any such instruction flow changing instruction to be determined. The predicted target address may be encoded directly within the relevant entry of the target prediction storage, or alternatively that entry may be used to identify a further target prediction structure that is to be referenced in order to predict the target address. For example, for an entry related to a function return instruction, then the target address itself may not be identified within the entry, but instead a return stack structure may be referred to in order to obtain the predicted target address.

In one example implementation, the prediction information obtained from the target prediction storage further identifies when an instruction flow changing instruction that is associated with the specified block of instruction addresses is conditionally executed. In such a case, the prediction information from the target prediction storage will typically need to be combined with other prediction information obtained from a direction prediction circuitry forming part of the prediction circuitry. In particular, the direction prediction circuitry is used to predict whether a conditional instruction flow changing instruction is taken or not taken, and hence this information can be used, in combination with the information from the target prediction storage, to identify the first instruction flow changing instruction within the current predict block that is predicted as taken, if any.

There are a number of situations that can be used to activate the detection circuitry to seek to detect whether the override condition can be triggered. In one example arrangement, when the current predict block is identified by a target address of an instruction flow changing instruction that was predicted to be taken, the detection circuitry is arranged to determine whether the target address resides within a specified block of instruction addresses for which the associated prediction information is retained within the buffer storage, and in that event to trigger the override condition. Hence, the fact that the current predict block results from a taken instruction flow changing instruction is used to activate the detection circuitry to determine whether the override condition is to be triggered.

The specified block of instruction addresses that the prediction circuitry considers when making an access to the prediction storage can take a variety of forms. In one example implementation the specified block of instruction addresses comprises a sequence of N aligned instruction addresses, where N is greater than M. When addresses are aligned, this means that a certain number of the most significant bits of all of those aligned addresses are the same. Hence, by way of example, if a sequence of instruction addresses are 32 byte aligned, this means that only the five least significant bits will change between the various instruction addresses. The use of aligned instruction addresses can significantly simplify the lookup procedure within the prediction storage. For example, the prediction storage may typically be organised as a set associative structure, and when the sequence of instruction addresses are aligned, this may enable the same index to be used for all of those addresses, and hence only a single set within the set associative cache may need to be accessed.

In one example arrangement, N is a multiple of M, the specified block of instruction addresses is composed of multiple sub-blocks, each sub-block comprising M aligned instruction addresses, and in the presence of the override condition, access to the prediction storage is suppressed for at least one of the sub-blocks. Hence, in such an arrangement significant power consumption benefits can be realised since accesses relating to entire sub-blocks can be avoided in situations where the override condition is detected.

As mentioned earlier, the detection circuitry can be activated when it is detected that the current predict block is identified by the target address of a taken instruction flow changing instruction. In some instances, the activation can be made dependent on the type of instruction flow changing instruction that has been taken. For instance, in one example implementation the detection circuitry is arranged to trigger the override condition on detecting that the current predict block is identified by a return address of a function return instruction and the buffer storage retains the prediction information associated with a specified block of instruction addresses that includes the instruction address of an associated function call instruction. In particular, it has been found that it is often the case that the function called by a function call instruction is relatively short, and hence by the time the associated function return instruction is taken, it is likely that the prediction information obtained when considering the function call instruction in an earlier prediction iteration will still be retained within the buffer storage. Further, since the return address of the function return instruction will be the instruction address immediately following the instruction address of the function call instruction, then it is likely that the prediction information retained in respect of the block considered in respect of the earlier function call instruction will contain prediction information that is now relevant to the current predict block (i.e. the predict block starting at the return address of the function return instruction).

However, the above assumption will only apply if the function call instruction was not a final instruction address in the associated block of instruction addresses that was considered when making a prediction for the predict block including that function call instruction. Accordingly, in one example implementation, the detection circuitry is arranged to suppress triggering the override condition when the instruction address of the associated function call instruction is a final instruction address in the specified block of instruction addresses. Hence, in that specific scenario, the detection circuitry will not trigger the override condition, and the prediction circuitry will access the prediction storage as normal.

In one example implementation, the detection circuitry may be arranged to determine that the buffer storage retains the prediction information associated with a specified block of instruction addresses that includes the instruction address of the associated function call instruction, based on knowledge about the function targeted by the associated function call instruction. For example, if it can be determined that the only instruction flow changing instruction in the function targeted by the associated function call instruction is the function return instruction, and that the number of instructions in the function does not exceed a threshold number, then it may be determined that the buffer storage still retains useful prediction information and that hence the override condition should be triggered.

There are a number of ways in which the detection circuitry can obtain such information about the function targeted by the associated function call instruction. For example, it may be arranged to reference the contents of the buffer storage directly in order to determine such information. In particular, as mentioned earlier the prediction information for each specified block can identify which instructions within that specified block are considered to be instruction flow changing instructions, and hence the contents of the buffer storage can be used to identify whether the only instruction flow changing instruction in the function targeted by the associated function call instruction is the function return instruction. With regard to assessing whether the number of instructions does not exceed a threshold number, then the information maintained by the buffer storage will enable the detection circuitry to identify the number of instructions that is in the function, i.e. the number of instructions to be executed between the target address of the function call instruction and the execution of the associated return instruction.

However, in an alternative implementation, it may be possible for the detection circuitry to obtain the required information about the function targeted by the associated function call instruction without needing to analyse the contents of the buffer storage directly. For instance, in one example implementation, the prediction storage is target prediction storage used to identify target addresses for instruction flow changing instructions, the target prediction storage comprising a plurality of entries, where each entry is arranged to identify a source instruction flow changing instruction and associated target address information for that source instruction flow changing instruction. The prediction storage may be arranged to be responsive to feedback from decode circuitry identifying that the only instruction flow changing instruction in the function targeted by the associated function call instruction is the function return instruction and the number of instructions in the function does not exceed a threshold number, to set a flag within the entry for the associated function call instruction. Then, when during consideration of a given predict block during a given prediction iteration, the prediction circuitry predicts that a first taken instruction flow changing instruction in that given predict block is the associated function call instruction, the set flag can be used to notify the detection circuitry that when the predict block identified by the return address of the function return instruction is considered during a subsequent prediction iteration the override condition is to be triggered.

Hence, in such an arrangement, the contents of the target prediction storage entries can be supplemented with an additional flag that is set within an entry for a function call instruction when it has been detected that the function called by that function call instruction meets the above criteria. The detection circuitry can then be directly notified when the flag is set, and the associated function call instruction is predicted to be the first taken instruction flow changing instruction in a given predict block, so that in due course when the predict block at the return address of the associated function return instruction is being considered, the override condition can be triggered, without needing at that stage to analyse the contents of the buffer storage. This can improve performance.

Another example implementation where the detection circuitry will not need to access the buffer storage in order to assess whether the override condition can be raised occurs when the target prediction storage is able to store two-taken entries. In particular, the target prediction storage may comprise at least one entry that is configurable as a two-taken entry to indicate that the source instruction flow changing instruction identified by that entry is a function call instruction with an associated first target address that identifies a series of instructions that is expected to exhibit static behaviour and that terminates with an associated return instruction that is unconditionally taken. If the series of instructions is expected to exhibit static behaviour, this means that the behaviour of that series of instructions will not change each time that series is encountered. As a result, this means that a two-taken entry can be populated, since it is known that if the function call instruction is taken, causing a branch to the associated first target address, it is expected that all of the series of instructions will be executed, resulting in the associated return instruction also being executed. Further, given that the associated return instruction is unconditional, it is known that that return instruction will be taken and hence will result in a branch to the return address. The return address is implicitly known when such a two-taken entry is created, since it is known that it will be the address immediately following the address of the function call instruction, and the address of the function call instruction is captured within the two-taken entry.

As a result, when during consideration of a given predict block during a given prediction iteration, the prediction circuitry predicts that a first taken instruction flow changing instruction in that given predict block is the function call instruction for which a two-taken entry is allocated, the detection circuitry may be notified that when the predict block identified by the return address of the function return instruction is considered during a subsequent prediction iteration, the override condition is to be triggered.

The technique described herein works particularly well with such two-taken entries since, when a prediction is made using such a two-taken entry, no intervening prediction is then needed for the predict block or predict blocks containing the body of the function called by the function call instruction, and instead the next prediction required will be in respect of the predict block identified by the return address of the function return instruction. Hence, the prediction information that can be re-used will be available within the buffer storage, even if the buffer storage only allows the retention of the prediction information from the immediately previous prediction iteration. Hence, through the use of such a two-taken entry approach, the size of the required buffer storage can be reduced if desired.

In addition to use of the technique in association with function call instructions and associated function return instructions, the technique can also be used in other situations where there is a likelihood that the retained prediction information can be used for a current predict block. For example, in one implementation the instruction flow changing instruction may be a branch instruction at an end of a loop, where the target address is a first instruction in the loop, and the detection circuitry may be arranged to trigger the override condition when the number of instructions in the loop does not exceed a threshold number. Hence, for such loops, there is a likelihood that with a relatively small sized buffer storage useful prediction information can be retained allowing its re-use without needing to access the prediction storage when considering the predict block that starts with the first instruction in the loop (i.e. the target address for the branch instruction at the end of the loop).

Particular examples will now be described with reference to the Figures.

FIG. 1 is a block diagram of an apparatus in accordance with one example implementation. The apparatus includes a branch predictor 10 that has associated therewith a fetch queue 40 (also referred to as a prediction address queue) that acts as an interface between the branch predictor and other components within the apparatus. In particular, the fetch queue identifies instruction addresses that are used to fetch instructions for execution by one or more execution units of the apparatus. Those addresses can be routed to an instruction cache 45 that retrieves the instructions at the identified addresses (if a hit is detected in the instruction cache for an input address, then the instruction can be output directly from the instruction cache, whereas otherwise the instruction can be requested from a lower level of a memory hierarchy forming the memory system and, when retrieved, can be output from the instruction cache). The fetched instructions are then forwarded to an instruction decoder 55 where they are decoded in order to produce control signals used to control the operation of the execution units so as to implement the operations required by those instructions.

In many systems, the instruction addresses identified in the fetch queue may be virtual addresses, and an instruction translation lookaside buffer (TLB) 50 can be referred to in order to convert those virtual addresses into physical addresses within the memory system, enabling the instructions to be fetched from the memory hierarchy as required.

The branch predictor 10 may be arranged during each prediction iteration to consider a predict block of instructions, where the predict block comprises a plurality of sequential instructions within the memory address space. The predict block may for example be identified by a start address identifying the first instruction address within the predict block, and the size of the predict block will typically be predetermined. For example, a 32 Byte predict block may be considered in each prediction iteration, and in one particular implementation each instruction may have an instruction address formed of 4 Bytes, such that each predict block represents eight instructions at sequential addresses in memory.

Each predict block is output by the multiplexer 15, and is added into the fetch queue, whilst also being provided to various branch prediction mechanisms within the branch predictor 10. The aim of the branch predictor is to predict whether any instructions identified by the predict block are instruction flow changing instructions that are predicted as taken. In the event that the predict block includes one or more of such instructions, then the location of the first instruction flow changing instruction that is predicted as taken is identified, and the target address of that instruction flow changing instruction is used to identify the start address for the next predict block. If no such instruction flow changing instructions are identified within the predict block, then the start address for the next predict block is merely the sequential address following the last address of the current predict block.

When the branch predictor 10 predicts that a predict block does include an instruction flow changing instruction that is predicted as taken, then the position of that instruction flow changing instruction is used to modify the content of the predict block as added into the fetch queue. For example, if it is determined that the fourth instruction in the sequence of eight identified by a predict block is predicted as taken, then the final four instructions will be discarded from the sequence of instructions identified within the fetch queue, so that those later instructions are not fetched for execution by the execution circuitry, and instead the next instruction fetched after the fourth instruction in that predict block will be the instruction at the predicted target address for the instruction flow changing instruction (i.e. the first instruction in the next predict block).

The branch predictor 10 can include a number of branch prediction components. As shown in FIG. 1, a branch direction predictor 35 can be used for seeking to predict whether a conditional instruction flow changing instruction will be taken or not taken. If an instruction flow changing instruction is not taken, then the next instruction to be executed will be the instruction immediately following that instruction flow changing instruction in the instruction address space. However, if the instruction flow changing instruction is predicted as taken, then a determination of the target address for that instruction is required, as the next instruction that will be predicted to be executed will be the instruction at that target address.

To assist in the prediction of target addresses, one or more branch target buffer (BTB) structures may be provided. For example, as illustrated in FIG. 1, a BTB 20 may be provided for making a prediction of the target address of an instruction flow changing instruction that is predicted as taken. Hereafter, any instruction flow changing instruction (whether formerly identified as a branch instruction, or some other instruction that causes a discontinuous change in instruction flow, such as a function call instruction or a function return instruction) will be referred to as a branch instruction. Hence, for a branch instruction that is predicted as taken, the BTB 20 can be used to assist in the determination of a target address for that branch instruction. In particular, an entry may be provided for that branch instruction, and may include information that is used to determine a predicted target address. That predicted target address may be encoded directly within the entry of the BTB, or alternatively a further target prediction structure may be referenced in order to predict the target address. For example, if the BTB entry 20 identifies that the branch instruction is a function return instruction, then the target address itself may not be identified within the BTB entry, but instead a return stack structure will be referred to in order to obtain the predicted target address.

By default, during each prediction iteration, a lookup is performed within the BTB 20 in order to produce prediction information that can be forwarded to the prediction logic 30. That prediction information will identify any instructions within the predict block that are identified in entries of the BTB as being branch instructions, and also will provide information to enable the target address for those branch instructions to be identified. Further, that prediction information will typically identify, for each branch instruction, whether that branch instruction is conditional or unconditional.

As shown in FIG. 1, the prediction logic 30 not only receives the prediction information from the BTB 20, but also branch direction predictions from the branch direction predictor 35. Hence, where the BTB identifies a conditional branch instruction, the information from the branch direction predictor can be used to predict whether that branch instruction will be taken or not taken. Hence, based on the combination of the information from the BTB 20 and the branch direction predictor 35, the prediction logic 30 can identify the location within the predict block of the first branch instruction that is predicted as taken, if any. In the event that the predict block does include a branch instruction that is predicted as taken, the prediction logic can then predict the target address, and route that target address back to the multiplexer 15. In the event that it is predicted that the predict block does not contain any branch instructions that are predicted as taken, then instead the next predict block can be identified by the address immediately following the address of the last instruction in the current predict block, with that address being provided to the other input of the multiplexer 15 (as indicated by the feedback loop 17 in FIG. 1), and with the prediction logic 30 then controlling the multiplexer appropriately.

Figure 2:
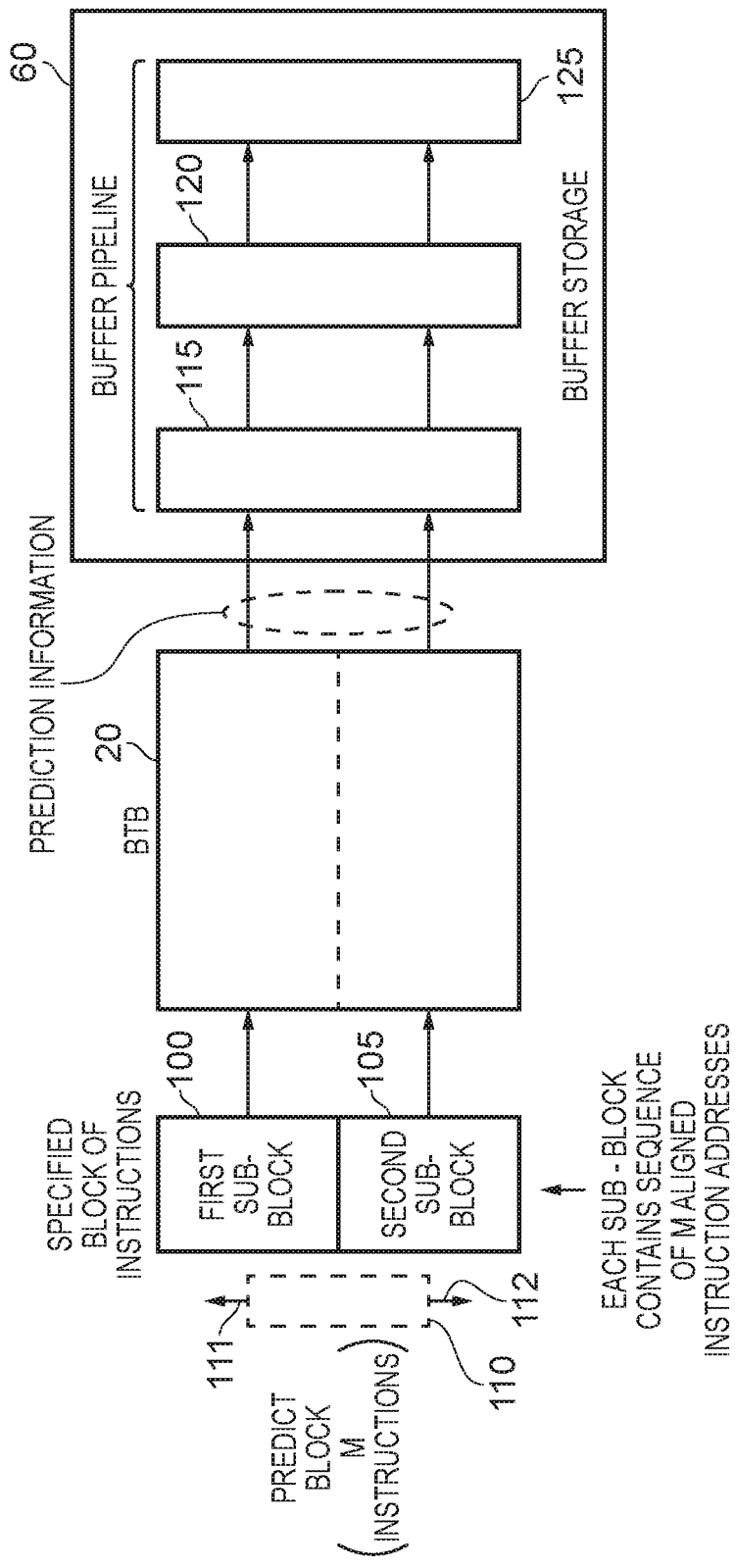
FIG. 2 illustrates in more detail the operation of the branch target buffer (BTB) of FIG. 1 in accordance with one example arrangement.

Whilst in principle the BTB could merely be accessed for the given predict block associated with each given prediction iteration, it will be appreciated that those predict blocks will not necessarily be instruction address aligned, and this could lead to some complexity in the lookup process within the BTB. As shown in FIG. 2, in order to simplify the lookup process, the BTB 20 is arranged, by default, to perform a lookup for a specified block of instructions that may include multiple sub-blocks 100, 105 (in the illustrated example two sub-blocks). In one particular implementation, each of the sub-blocks comprises M aligned instruction addresses and each predict block comprises a sequence of M instructions. The specified block of instructions formed by the first and second sub-blocks 100, 105 is chosen so that it contains the predict block 110, but as indicated by the arrows 111, 112 in FIG. 2, the actual location of the predict block within the specified block will vary dependent on the start address of the predict block.

As shown in FIG. 2, the BTB 20 can hence be viewed as having two lookup paths, one in relation to the first sub-block 100 and one in relation to the second sub-block 105. As a result of the lookup operation performed using the specified block, prediction information is then output relating to all of the instructions within the specified block. It will be appreciated that from the point of view of the prediction logic 30, the prediction logic is only concerned about the prediction information relating to the current predict block. However, as shown in FIG. 2, the entire prediction information that is output from the BTB 20 can be captured within a buffer storage 60. The aim of the buffer storage is to retain the prediction information obtained from the BTB 20 during one or more previous prediction iterations, so as to selectively allow that information to be used during a later prediction iteration, in order to reduce the extent to which the BTB 20 needs to be accessed.

The amount of prediction information that can be retained within the buffer storage 60 will depend on the configuration of the buffer storage, but in the example shown in FIG. 2 the buffer storage is considered to comprise of three pipeline stages 115, 120, 125, where each pipeline stage can retain the prediction information from a prediction iteration. Hence, when the prediction information is output from the BTB, it will initially be retained within the buffer storage element 115, but when during a subsequent prediction iteration another block of prediction information is produced, the contents within the buffer storage 115 will be propagated on to the pipeline stage 120 in order to make room for the new prediction information being stored within the pipeline stage 115. This process will continue during each prediction iteration, so in this particular example it will be appreciated that the prediction information is retained for three subsequent prediction iterations. It will be appreciated that the number of pipeline stages provided within the buffer storage can be varied dependent on implementation.

As shown in FIG. 1, detection circuitry 65 is used to seek to determine situations where, for a current predict block being considered during a current prediction iteration, that current predict block includes one or more instruction addresses for which the associated prediction information is still retained in the buffer storage. In that event, the detection circuitry can trigger an override condition that causes the BTB 20 to be at least partially deactivated during the current prediction iteration, so as to avoid re-accessing in the BTB any prediction information that is already held within the buffer storage 60. This can significantly reduce the power consumption associated with the BTB 20, and thereby reduce the overall power consumption associated with the branch prediction circuitry.

There are a number of ways in which the detection circuitry can be activated to assess whether the override condition can be triggered. In one example arrangement, when the prediction logic determines that the next predict block is to be identified by a target address of a branch instruction (i.e. the prediction logic has identified that there is a taken branch in the currently considered predict block), then it can issue a signal to the detection circuitry to cause the detection circuitry to determine whether the override condition can be asserted when seeking to make a prediction for the next predict block. As will be apparent from the later discussions, there are a number of ways in which the detection circuitry 65 can determine whether the override condition is present, but in at least some implementations this involves a review of the contents of the buffer storage 60.

If the override condition is asserted, then the BTB 20 will be at least partially deactivated, and hence the prediction logic 30 may need to review the contents within the buffer storage 60 in order to obtain at least part of the prediction information required to make a prediction in respect of the predict block under consideration.

The extent to which the BTB 20 can be deactivated upon detection of the override condition will depend on the range of addresses forming the next predict block that is to be reviewed. If that next predict block lies entirely within an address space for which prediction information has already been output and is stored within the buffer storage, then the BTB 20 can be entirely deactivated in the presence of the override condition, since the prediction logic 30 can obtain all of the required prediction information from the buffer storage 60 contents. However, in some instances it may be that only part of the instruction address space of the predict block to be considered falls within the address space for which prediction information has already been obtained and which is currently retained within the buffer storage 60, and in that instance the BTB will be partially activated. Considering the example of FIG. 2, this may for example mean that only one sub-block needs to be considered during the prediction iteration where the override condition is asserted, hence enabling the power consumption associated with the BTB lookup process to be potentially halved during that prediction iteration where the override condition is asserted.

Figure 3:
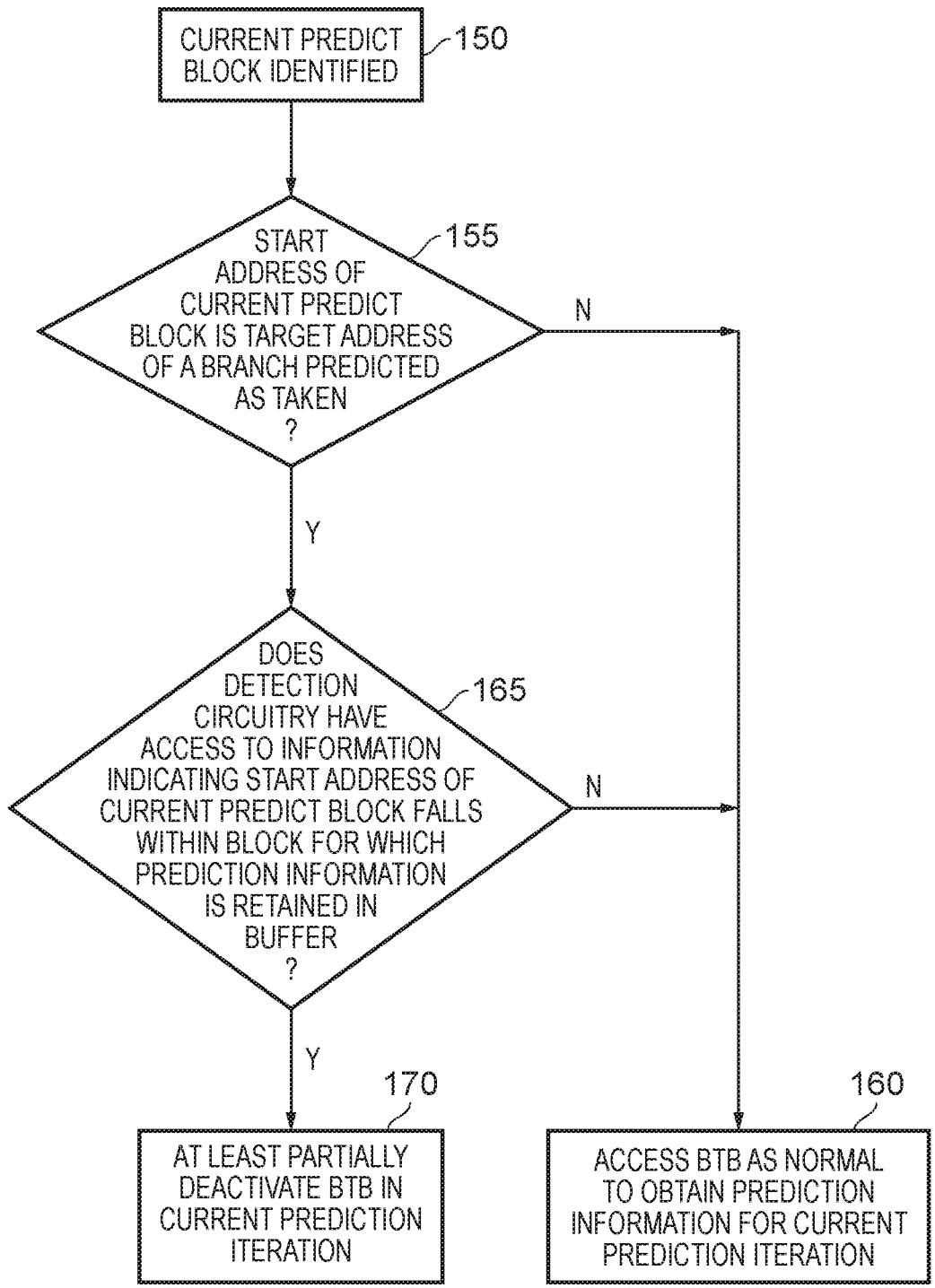
FIG. 3 is a flow diagram illustrating the operation of the detection circuitry of FIG. 1 in one example arrangement.

FIG. 3 is a flow diagram illustrating the operation of the detection circuitry 65 in one example arrangement. At step 150 a current predict block is identified. In this context, the current predict block is the predict block that has been identified by the prediction logic 30 as being the next predict block for which a prediction is required. Hence, it is the predict block that will be identified next by the output of the multiplexer 15.

At step 155, the detection circuitry determines whether the start address of the current predict block is the target address of a branch that is predicted as taken. As discussed earlier, this information can be indicated by the output of the prediction logic 30. If that is not the case, then the process proceeds to step 160, where the override condition is not asserted, and instead the BTB is accessed as normal to obtain the prediction information for the current prediction iteration.

If it is determined at step 155 that the start address of the current predict block is the target address of a branch that is predicted as taken, then the process proceeds to step 165 where it is determined whether the detection circuitry has access to information indicating that the start address of the current predict block falls within a block for which prediction information is retained in the buffer storage 60. As will be apparent from the following discussion, there are a number of ways in which the detection circuitry can determine whether this condition is met. If the condition is met, then at step 170 the override condition can be asserted to at least partially deactivate the BTB during the current prediction iteration. However, if the condition is not met, then as indicated in FIG. 3 the process proceeds to step 160, where the BTB is accessed as normal to obtain the prediction information.

In some implementations, step 155 is modified so that it is not merely sufficient that the start address of the current predict block is a target address of a branch instruction predicted as taken, but that it is a requirement that the branch instruction predicted as taken is of a particular form. Two example scenarios will be discussed herein, firstly where the branch instruction is a return instruction at the end of a function that has been called by an associated function call instruction, and secondly where the branch instruction is a branch instruction at the end of a relatively small loop of instructions.

Figure 4:
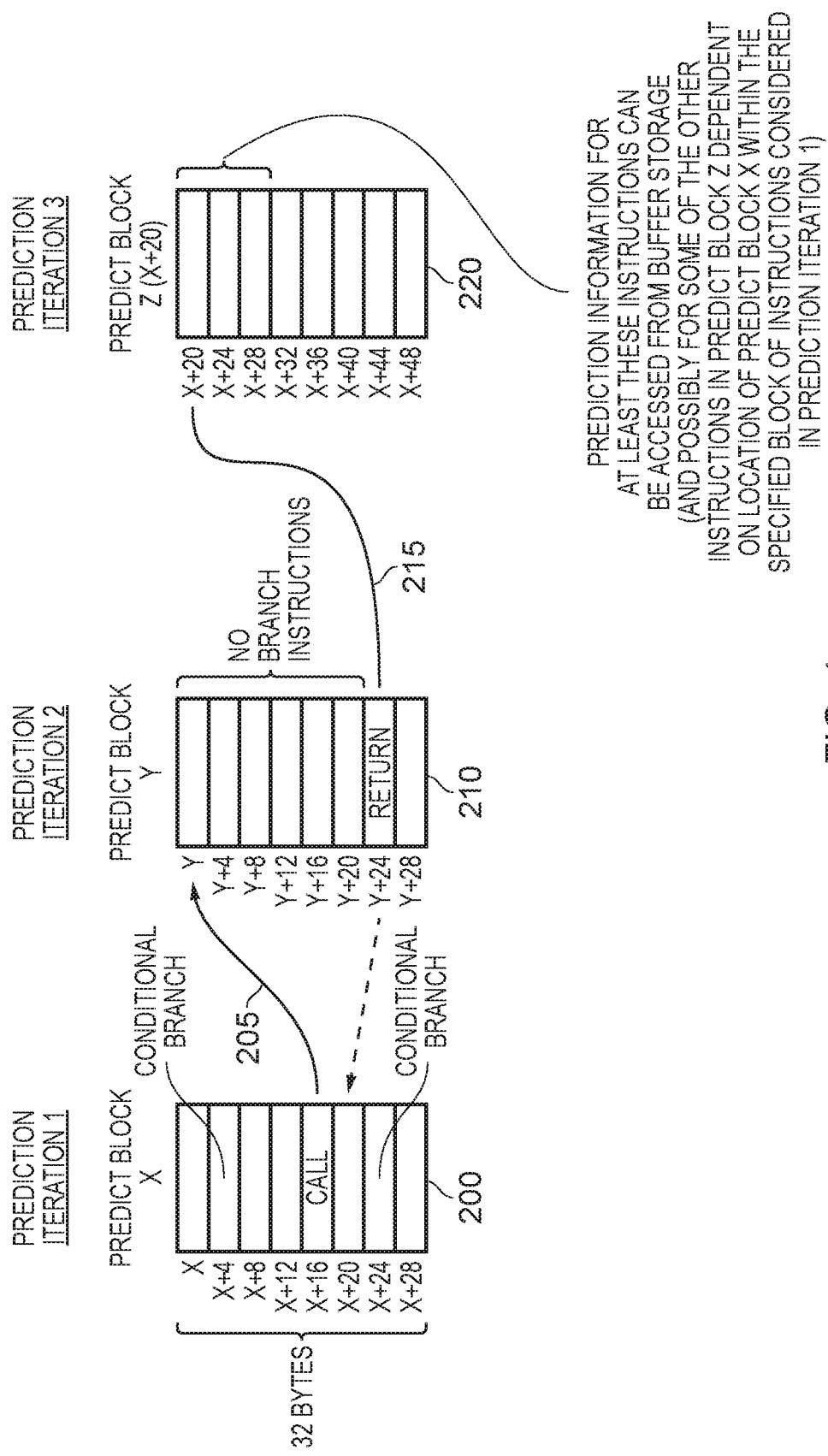
FIG. 4 illustrates an example sequence of predict blocks considered by the prediction circuitry in a series of prediction iterations, identifying a scenario where the prediction information for at least some of the instructions in the third predict block can be accessed from the buffer storage of FIG. 1, in one example implementation.

FIG. 4 illustrates an example sequence of execution flow where the information captured within the buffer storage 60 may allow the BTB 20 to be at least partially deactivated during a certain prediction iteration (prediction iteration 3 in the example shown in FIG. 4). In this example, it is assumed that during prediction iteration 1 predict block X 200 is considered. As per the earlier discussed example, it is assumed that each predict block is 32 bytes, providing instruction addresses for eight sequential instructions. In this particular example, it is assumed that the prediction information output in association with that predict block identifies three branch instructions within the predict block, namely a conditional branch instruction at address X+4, a function call instruction at address X+16, and a conditional branch instruction at address X+24. In this particular example, it is assumed that the branch direction predictor 35 predicts that the conditional branch instruction at address X+4 is not taken, and hence the first taken branch will be the function call instruction at address X+16. In particular, in this example it is assumed that the function call is unconditional, and hence there is no need to obtain a branch direction prediction for the function call instruction.

It is assumed that the prediction information obtained from the BTB 20 identifies that the target address for the function call instruction is address Y, as indicated by the arrow 205 in FIG. 4. Hence, the next predict block to be considered during prediction iteration 2 is the predict block Y 210 shown in FIG. 4. In this example, it is assumed that the prediction information output identifies that there are no branch instructions within the predict block until the return instruction at address Y+24. The return instruction is unconditionally taken, and the target address will be the sequential address immediately following the associated function call instruction, i.e. address X+20 as shown by the arrow 215.

Hence, during prediction iteration 3, the predict block to be considered is predict block Z 220 having a start address of X+20. As will be appreciated from a review of the earlier predict block X, the first three addresses within the predict block Z were also contained within the predict block X, and hence at least the prediction information for those three instructions will still be retained within the buffer storage, assuming the buffer storage contains at least two pipeline stages. Hence, the override condition can be detected, and the BTB 20 can be at least partially deactivated during the prediction iteration 3.

However, as will be apparent from FIG. 2, due to the fact that the specified block of instructions considered by the BTB during each prediction iteration is actually larger than the predict block directly under consideration, then it is possible that the buffer storage may also contain prediction information for some of the other instructions in predict block Z. For instance, if the predict block X was predominantly within the first sub-block 100 shown in FIG. 2, then it will understood that during the prediction iteration 1 the obtained prediction information captured within the buffer would also contain the prediction information for the second sub-block 105, and that is likely to contain the prediction information required for the remaining instructions in the predict block Z. Hence, it may be the case that the entire BTB can be deactivated during prediction iteration 3.

Figure 5:
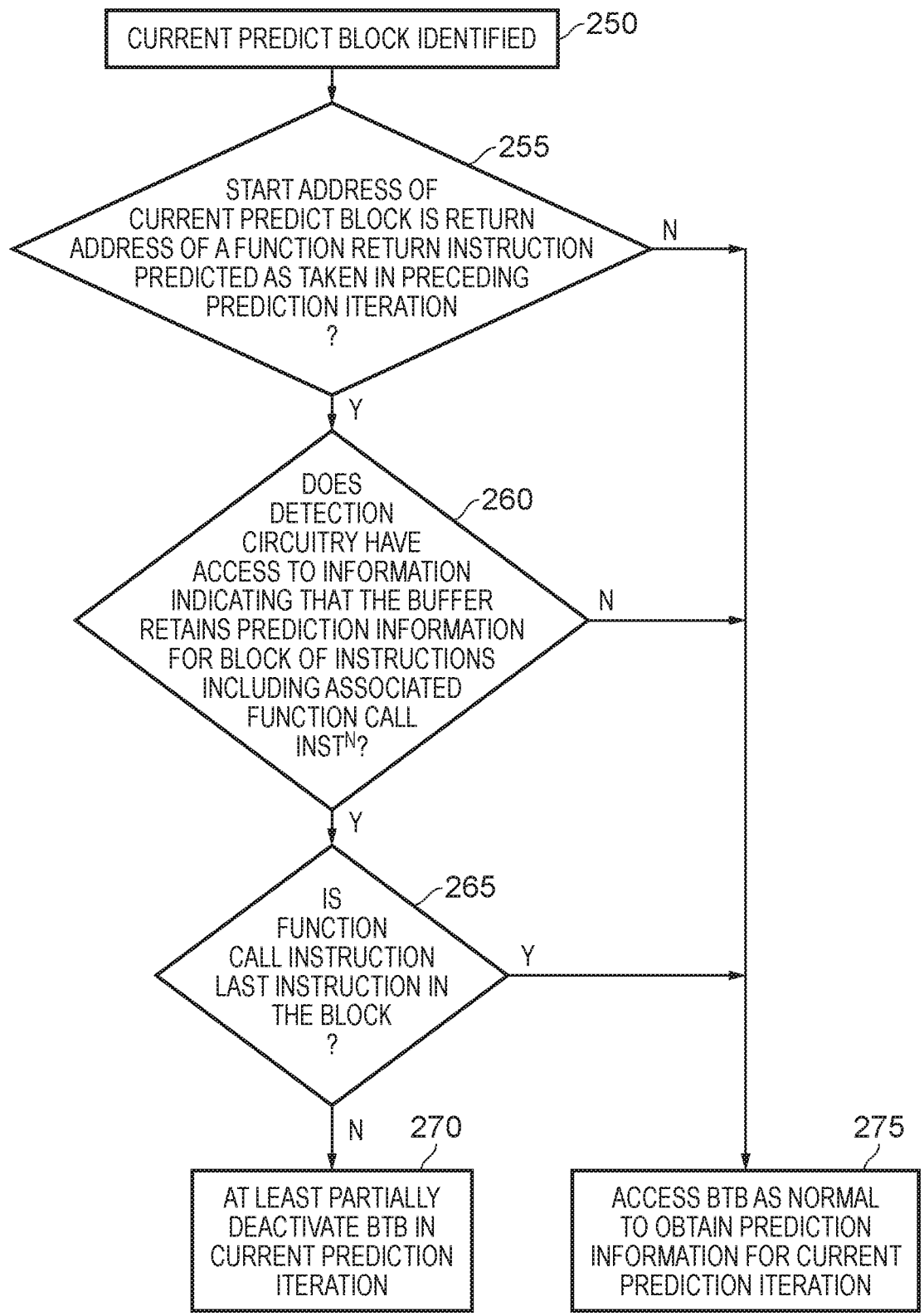
FIG. 5 is a flow diagram illustrating the operation of the detection circuitry upon detecting that the start address of a current predict block is a return address of a function return instruction predicted as taken, in accordance with one example arrangement.

FIG. 5 is a flow diagram illustrating the operation of the detection circuitry 65 to determine whether the override condition is present for a predict block identified by the target address of a return instruction (that target address also being referred to herein as a return address). Hence, at step 250 the current predict block is identified, and then at step 255 it is determined whether the start address of that current predict block is a return address of a function return instruction predicted as taken in the preceding prediction iteration. As will be apparent from the earlier discussion of FIG. 4, this will for example be the case if the current predict block identified at step 250 is the predict block Z 220. If this is not the case, then the process proceeds to step 275 where the BTB is accessed as normal to obtain the prediction information for the current prediction iteration.

However, if this is the case, then the process proceeds to step 260, where it is determined whether the detection circuitry has access to information indicating that the buffer retains prediction information for the block of instructions including the associated function call instruction. As will be discussed later herein, there are a number of mechanisms that can be used to assess whether this condition is present or not. If it is not, then the process proceeds to step 275 where the BTB is accessed as normal, but if the condition is present the process proceeds to step 265 where it is determined whether the function call instruction was the last instruction in the relevant block identified at step 260. In particular, if the function call instruction was the last instruction, i.e. was the last instruction in the second sub-block 105 as shown in FIG. 2, then it will be understood that the return address will not be covered by the prediction information obtained for the specified block containing the first sub-block 100 and the second sub-block 105.

There are a number of ways in which the detection circuitry could assess whether the function call instruction was the last instruction in the block, but in one example implementation that information will be captured as part of the prediction information output by the BTB 20 when the prediction was made in respect of the function call instruction, and hence the detection circuitry 65 can obtain that information from the buffer storage 60.

If the function call instruction was the last instruction in the relevant block, then the process proceeds to step 275 where the BTB is accessed as normal, but otherwise the process can proceed to step 270 where the BTB can at least partially be deactivated in the current prediction iteration.

Figure 6:
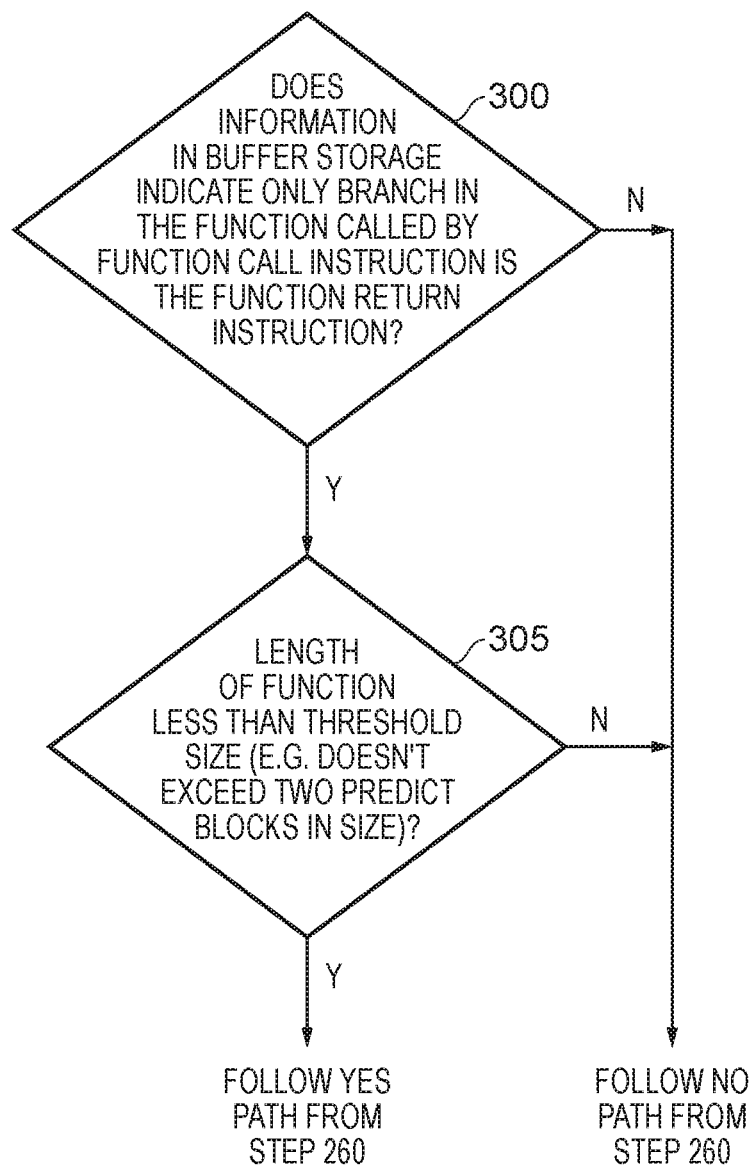
FIG. 6 is a flow diagram illustrating in more detail performance of the step 260 of FIG. 5 in one example arrangement.

FIG. 6 is a flow diagram illustrating one technique that can be used to implement step 260 of FIG. 5. In particular, in accordance with this technique the detection circuitry 65 accesses the contents of the buffer storage 60 in order to determine whether the condition of step 260 is met. Hence, at step 300 the detection circuitry assesses whether the information in the buffer storage indicates that the only branch instruction in the function called by the function call instruction is the function return instruction. As discussed earlier, the prediction information output during each prediction iteration identifies the location of any branch instruction within the specified block considered by the BTB during that prediction iteration, and hence identifies the location within the instruction sequence of each branch instruction. Hence, considering the example of FIG. 4, the prediction information associated with the specified block that encapsulated the predict block Y will identify whether any of the instructions between addresses Y and Y+24 are branch instructions, and hence it can be assessed with reference to the contents of the information held in the buffer storage whether the only branch in the function called by the function call instruction is the function return instruction. If not, then the no path from step 260 is followed.

However, if at step 300 it is determined that the return instruction is the only branch in the function, then at step 305 it is determined whether the length of the function is less than some threshold size. If the function is too long, for example spanning more than a threshold number of predict blocks, it may be that even though there were no branch instructions within that function, the length of the function is such that the prediction information relating to the original predict block that included the function call instruction has now been evicted from the buffer storage, and hence is not available to refer to anymore. Hence, if the length of the function is not less than the threshold size, the no path from step 260 is followed, but if the length of the function is less than the threshold size the yes path from step 260 is followed. In one particular example arrangement, the threshold size is set to identify that the function does not exceed two predict blocks in size.

Figure 7A:
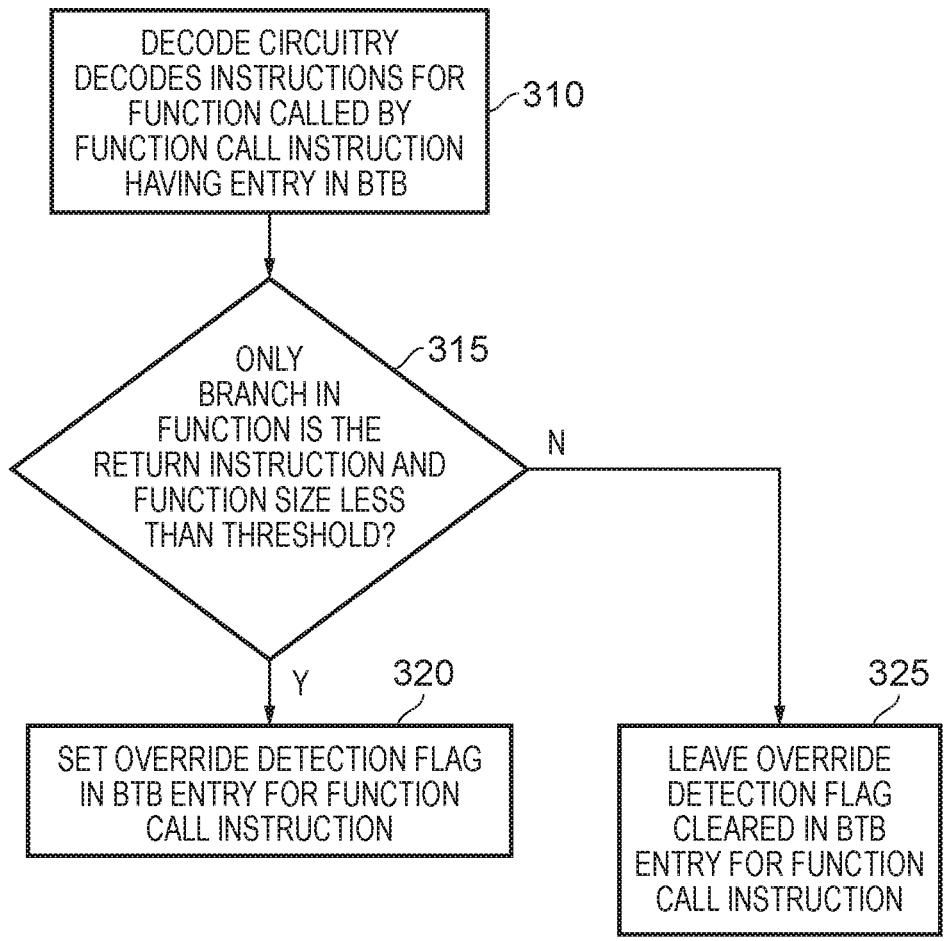
FIGS. 7A and 7B illustrate the use of an override detection flag within a BTB entry in one example arrangement.
Figure 7B:
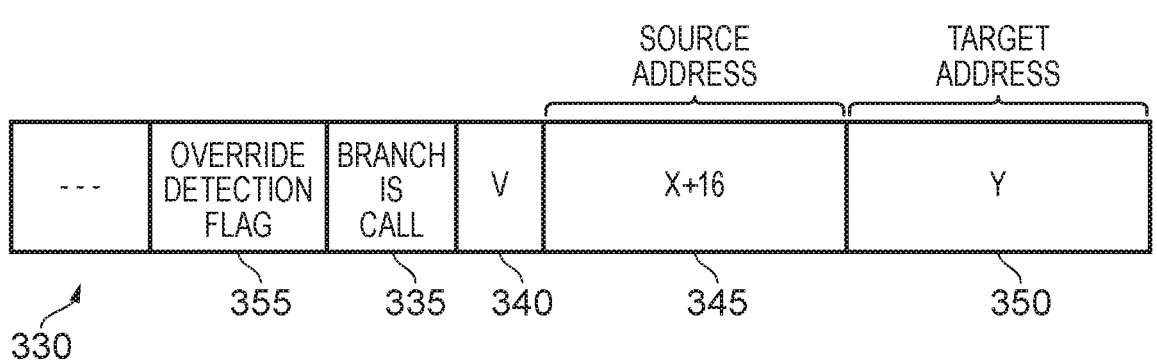
Figure 7C:
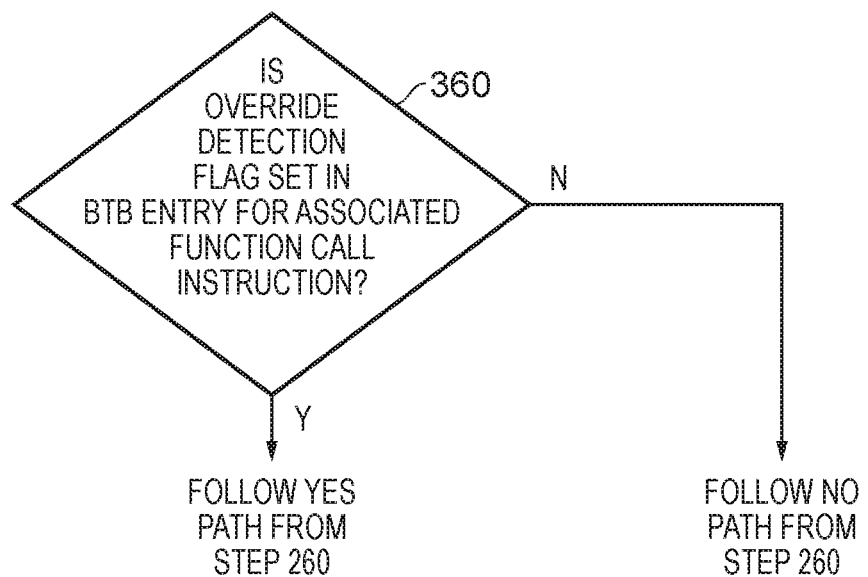
FIG. 7C is a flow diagram illustrating how step 260 of FIG. 5 may be implemented in situations where the BTB entries include such an override detection flag.

FIGS. 7A to 7C illustrate an example implementation where the entries within the BTB can be supplemented so as to enable the detection circuitry 65 to detect the presence of the override condition without the need to analyse the contents of the buffer storage 60. FIG. 7A illustrates a process performed when decoding instructions for a function called by a function call instruction. In particular, at step 310, it is assumed that a function has been called by a function call instruction that had an entry in the BTB 20, and that those instructions required by the function have been retrieved via the instruction cache 45 based on the addresses forwarded from the fetch queue 40, with those instructions then being passed to the instruction decoder 55. Accordingly, at step 310 the decode circuitry is decoding the instructions for the function called by that function call instruction and hence at that time can determine information about the function. Hence, at step 315 it can be assessed whether the only branch instruction in the function is the return instruction, and can also be assessed whether the function size is less than a threshold value, i.e. that the total number of instructions within the function is less than a threshold number. If that is the case, then the instruction decoder 55 can provide a feedback signal to the BTB 20 to enable contents of the BTB entry for the original function call instruction to be updated, as indicated by step 320. In particular, at step 320 an override detection flag within the BTB entry can be set for the function call instruction. This flag is illustrated schematically in FIG. 7B, which shows a BTB entry 330 that has been allocated for a function call instruction. In particular, for the purposes of illustration, it is assumed that the BTB entry 330 relates to the function call instruction indicated within the predict block X 200 of FIG. 4. Accordingly, the source address field 345 identifies the address X+16 and the target address field 350 identifies the target address Y. The valid field 340 is set to identify that the entry is valid, and the branch type field 335 is set to identify that the branch instruction is a call instruction. An override detection flag field 355 can also be provided, which is initially cleared, but when step 320 is reached that field is then set.

If at step 315, it is determined that the condition specified therein is not met, then the process proceeds to step 325 where the override detection flag is left in its cleared state in the BTB entry for the function call instruction.

FIG. 7C is a flow diagram illustrating how step 260 of FIG. 5 may be implemented when the BTB entries include the above discussed override detection flag. In particular, at step 360 it is determined whether the override detection flag is set in the BTB entry for the associated function call instruction. In particular, due to the way in which the override detection flag is set using the process discussed earlier in FIG. 7A, it will be appreciated that if the flag is set, this does mean that the buffer will retain prediction information for a block of instructions including the associated function call instruction, and accordingly the yes path from step 260 can be followed. Otherwise, the no path from step 260 will be followed.

In order for the detection circuitry 65 to perform the analysis at step 360, it needs to have access to the state of the override detection flag in the BTB entry for the associated function call instruction. Whilst it could in principle access the BTB to obtain this information at the time it needs to assess this condition, in one implementation, at the time the BTB was accessed in association with the function call instruction, that flag state information can be captured and then buffered so that it can be referenced in due course by the detection circuitry when performing the process of FIG. 5, thereby avoiding the need to re-access the BTB. Hence, considering the example of FIG. 4, that override detection flag state in association with the function call instruction for the predict block X 200 can be captured during prediction iteration 1, so that during prediction iteration 3 the prediction circuitry can determine whether the flag was set in the BTB entry for the associated function call instruction.

Figure 8:
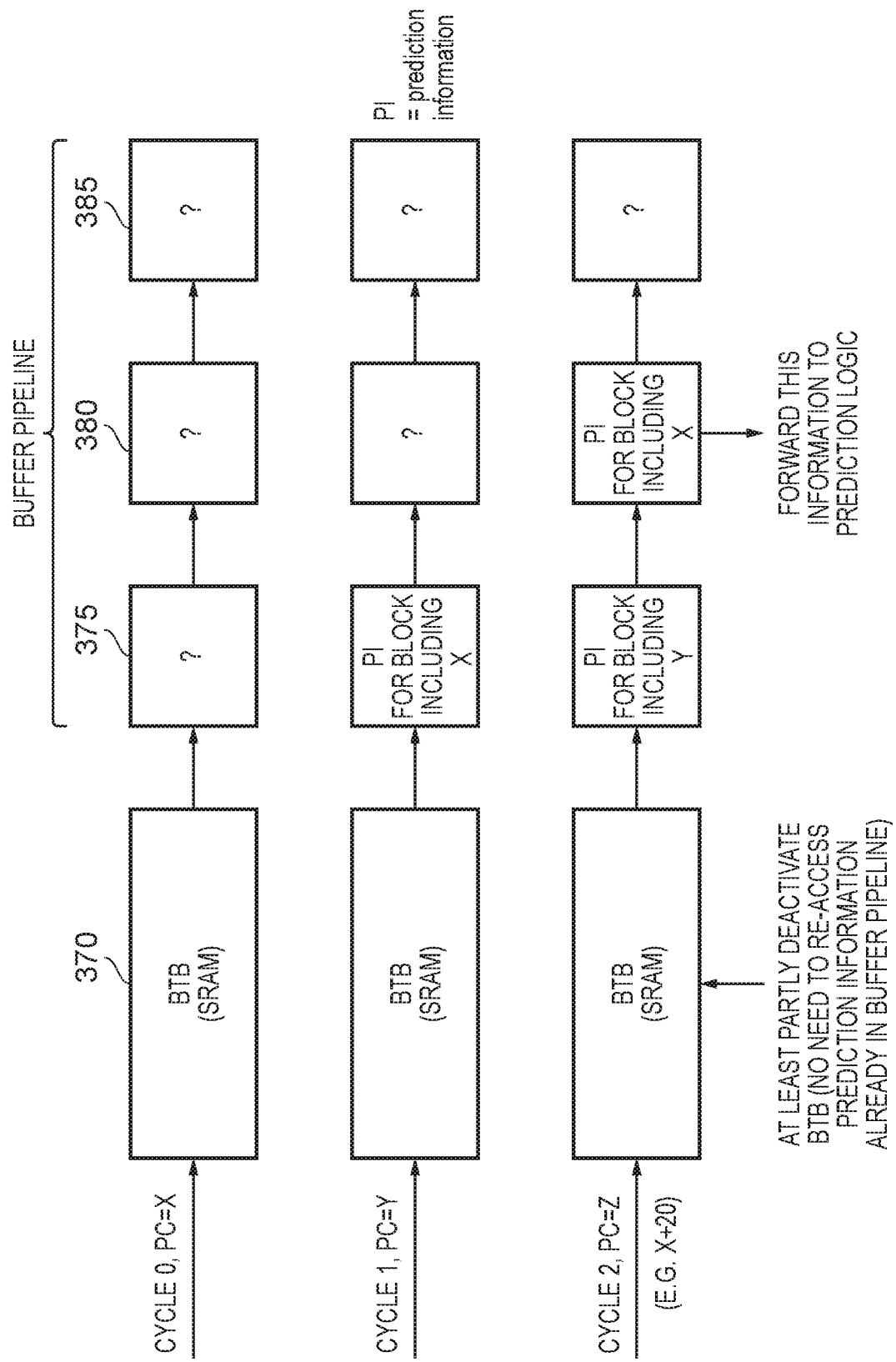
FIG. 8 illustrates how the contents of the buffer pipeline may be used to at least partly deactivate the BTB when a sequence of predict blocks such as that illustrated in FIG. 4 is encountered.

FIG. 8 is a diagram schematically illustrating the use of the buffered prediction information in order to reduce the power consumption associated with the BTB. In particular, a series of prediction iterations (referred to in FIG. 8 as cycles) are shown. Also shown is the BTB 370 with the associated buffer pipeline stages 375, 380, 385 forming the buffer storage. During cycle 0, the predict block X 200 shown in FIG. 4 is being considered and the current prediction information buffered within the buffer pipeline stages 375, 380, 385 is not relevant. Where that prediction information as buffered in the buffer pipeline is not relevant, a question mark symbol has been used in FIG. 8.

In the second prediction iteration, referred to as cycle 1 in FIG. 8, it will be appreciated from the earlier discussed FIG. 4 that the predict block Y is being considered, and that the buffer pipeline stage 375 will be retaining the prediction information for the block that included the predict block X.

In the next prediction iteration, the predict block Z will be being considered and the buffer pipeline stage 375 will include the prediction information for the block including predict block Y, while the buffer pipeline stage 380 will include the prediction information for the block including the predict block X. At this point, the detection circuitry will detect the presence of the override condition, and the information held in the buffer pipeline stage 380 will be forwarded to the prediction logic 30 for use in making the prediction in association with the current predict block Z. In addition, the BTB 370 will at least partially be deactivated, since there is no need to re-access the prediction information that is already in the buffer pipeline.

In another example implementation, it is possible in certain situations to create a two-taken entry within the BTB 20 in association with certain function call instructions. In particular, where the function call instruction has an associated target address that identifies a series of instructions that is expected to exhibit static behaviour and that terminates with an associated return instruction that is unconditionally taken, it may be possible to capture within a single BTB entry enough information to enable both that series of instructions and the predict block at the target address of the return instruction to be added into the fetch queue, without needing to perform any intervening prediction in relation to the series of instructions, so that the next prediction iteration following the prediction iteration that dealt with the function call instruction can itself deal with the predict block at the target address of the return instruction. Hence, considering the specific example of FIG. 4, based on a two-taken entry associated with the function call instruction in predict block X 200, it would be possible to add both predict block Y and predict block Z into the fetch queue 40, but for the prediction iteration 2 to deal directly with the predict block Z, since no separate prediction is required for the predict block Y.

If the series of instructions is expected to exhibit static behaviour, this means that the behaviour of that series of instructions will not change each time the series is encountered. Hence, by way of example, for the series of instructions to exhibit static behaviour, there must be no conditional branch instructions in that series of instructions. In one implementation, the series of instructions will be viewed as exhibiting static behaviour if it has no branch instructions in it at all other than the return instruction at the end of the series of instructions. Further, because that return instruction is unconditional, it also has static behaviour, and its return address is predictable, since it is known that it will be the sequential address following the address of the function call instruction, and that address will be captured within the two-taken entry.

In order to identify situations where a two-taken entry can be formed, the fetch queue 40 can be monitored to identify situations where the instructions to be executed follow a pattern such as shown in FIG. 4, and then feedback information from the decoder can be used to confirm whether instruction sequence Y has static behaviour. If so, a two-taken entry can be allocated.

Figure 9:
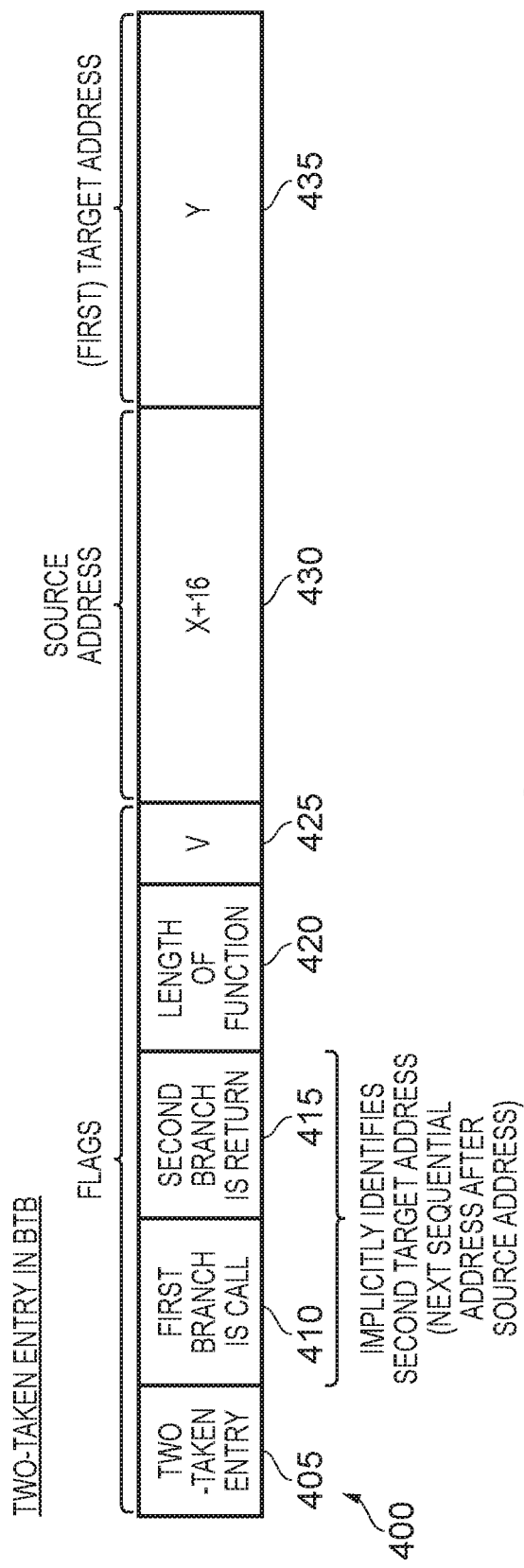
FIG. 9 is a diagram schematically illustrating a two-taken entry that may be provided within the BTB in accordance with one example implementation.

An example of such a two-taken entry is illustrated in FIG. 9. In particular, the entry 400 has a source address field 430 and a target address field 435. Assuming the example of FIG. 4, the source address field 430 will capture the address X+16, and the target address field 435 will capture the target address Y.

The entry 400 also includes a number of flag fields. In particular, a two-taken entry field 405 is provided which can be set to identify that the entry is a two-taken entry, and which can be cleared to indicate that the entry is a standard entry. In the event that the entry is a two-taken entry, additional branch status fields 410, 415 can be provided to identify the nature of the first and second branch instructions. For the purposes of the discussion herein, the two-taken entry will relate to a situation where the first branch is a function call instruction and the second branch is a function return instruction, and this information can be captured within those flag fields 410, 415. When the type information indicates that the first branch instruction is a call instruction and the second branch instruction is a return instruction, then this implicitly identifies the second target address, i.e. the target address of the return instruction, since it is known that that will be the next sequential address after the address identified in the source address field 430. Hence, the second target address does not need to be captured explicitly within the entry 400.

A field 420 is used to capture the length of the function called by the function call instruction, this information being needed in order to determine the instruction addresses to be added in to the fetch queue when using such a two-taken entry. Further, a valid flag 425 is used to identify whether the entry contains valid information or not.

Figure 10:
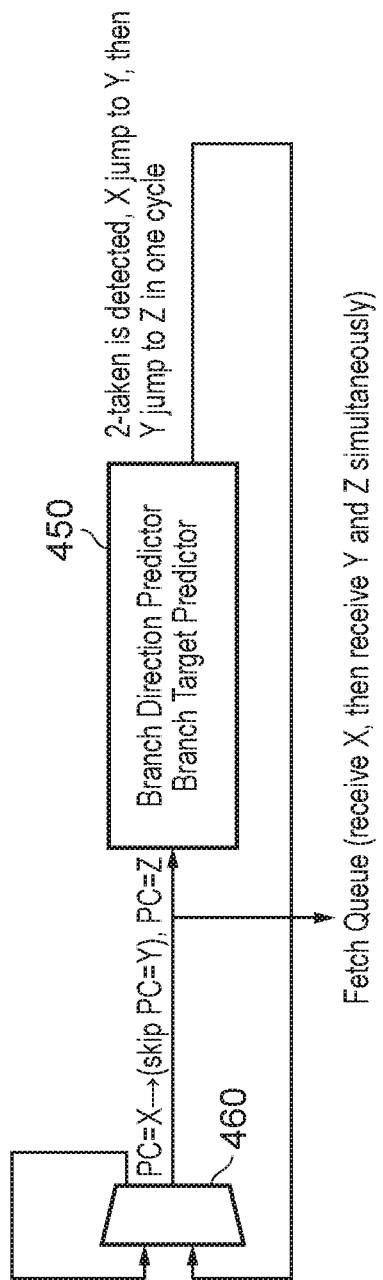
FIG. 10 schematically illustrates how prediction can be skipped for the predict block Y in the presence of a two-taken entry within the branch target buffer, in accordance with one example implementation.

The use of such a two-taken entry to speed up prediction is illustrated schematically in FIG. 10. The multiplexer 460 corresponds to the multiplexer 15 shown in FIG. 1, and the prediction element 450 incorporates the various branch prediction components 20, 30, 35, 60, 65 shown in FIG. 1. When the specified block including the predict block X is pushed into the prediction element 450, a two-taken entry is detected, which identifies that the predict block X will transition to the predict block Y and then the predict block Y will transition to the predict block Z. This information is captured in one cycle, and both the predict blocks Y and Z can be added simultaneously to the fetch queue in the next cycle, but with the predict block Z being the next predict block provided via the multiplexer 460 to the prediction element 450.

Figure 11:
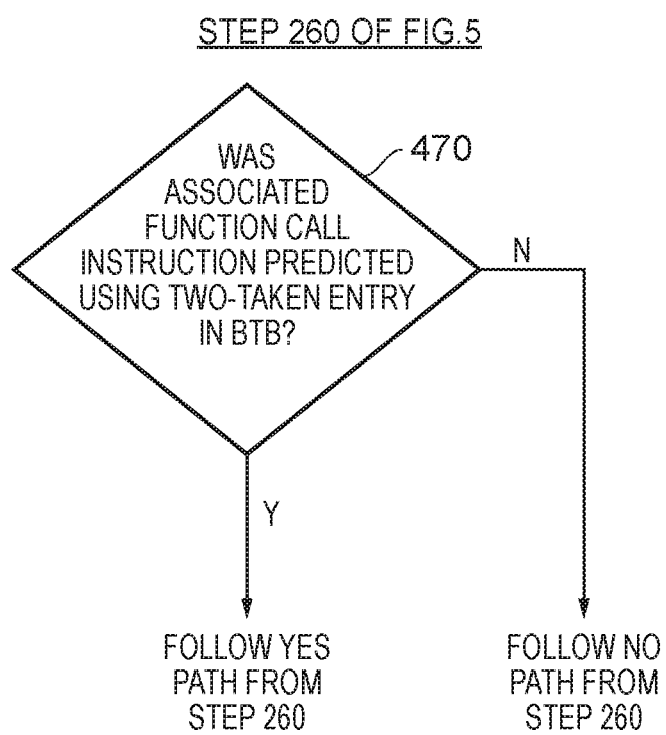
FIG. 11 is a flow diagram illustrating how step 260 of FIG. 5 may be implemented when a prediction is made using a two-taken entry, in accordance with one example implementation.

However, in addition to speeding up the operation of the prediction circuitry by enabling a prediction in respect of predict block Y to be skipped, when such a two-taken entry is used this can also identify a situation where the override condition can be triggered. Hence, as shown in FIG. 11, step 260 of FIG. 5 may be implemented by checking whether the associated function call instruction was predicted using a two-taken entry in the BTB. This check can be performed at step 470, and if the associated function call instruction was predicted using a two-taken entry, then the yes path from step 260 can be followed since it is known that the buffer will retain prediction information for the block of instructions including the associated function call instruction. However, if the condition indicated in step 470 is not met, then the no path may be followed from step 260. Alternatively, the mechanism of FIG. 11 can be combined with some of the other mechanisms described earlier, so that additional checks can be performed to determine whether the override condition can still be triggered even though a two-taken entry has not been used.

Figure 12:
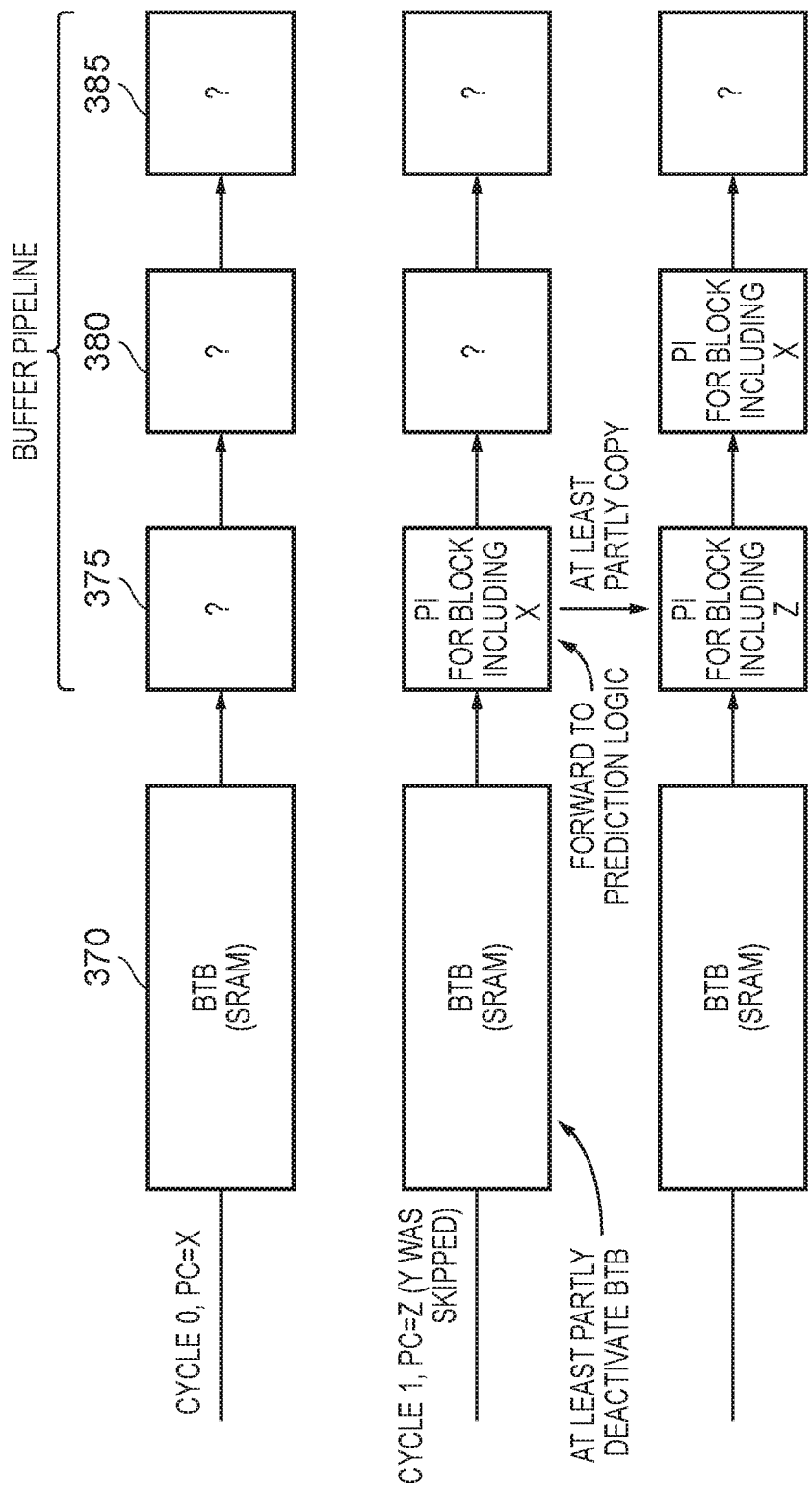
FIG. 12 illustrates how the BTB may be at least partly deactivated when a prediction has been made using a two-taken entry, in accordance with one example implementation.

FIG. 12 is a diagram similar to the earlier described FIG. 8 but illustrating the situation that arises when a two-taken entry is used. In particular, it can be seen that following the first iteration cycle, in the second iteration cycle it is the predict block Z that is being considered, since prediction can be skipped for the predict block Y. Accordingly, the prediction information for the block including the predict block X will still reside within the buffer pipeline stage 375 and can forwarded to the prediction logic 30 for use in making the prediction in respect of the predict block Z. The BTB 370 can then at least partly be deactivated during that prediction iteration. As shown by the final line in FIG. 12, when the prediction information for the block including predict block X is propagated onto the pipeline buffer stage 380, then the prediction information for the block including the predict block Z can be populated within the buffer pipeline stage 375. This will at least partly be a copy of the information that was maintained in association with the block including the predict block X, and the only additional information added will be information obtained from any partial lookup performed within the BTB. As discussed earlier, in some instances it may be the case that the entirety of the information can be obtained without accessing the BTB, and in that instance the prediction information for the block including predict block Z can merely be a direct copy of the prediction information for the block including predict block X.

Figure 13:
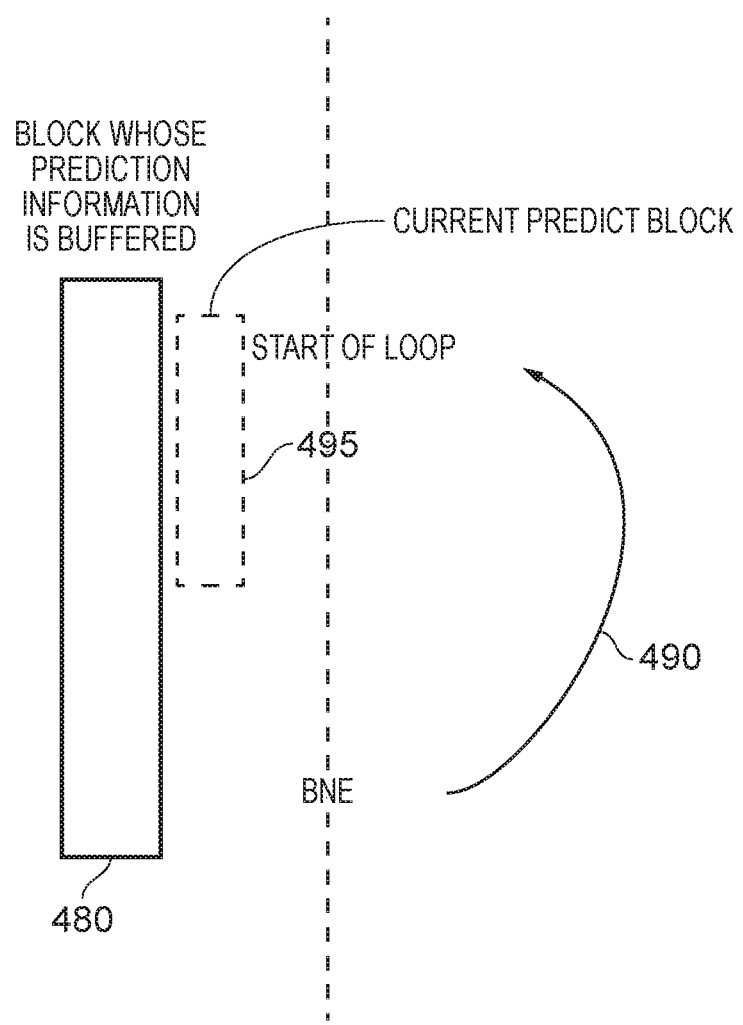
FIG. 13 illustrates how the techniques described herein may also be used in association with instruction sequences including small loops, in accordance with one example implementation.

FIG. 13 illustrates how the techniques described herein can also be used in association with other instruction sequences. In particular, a small loop is considered which terminates with a branch instruction (in particular a branch not equal (BNE) instruction in the example illustrated in FIG. 13). If the not equal condition is met, then the branch will be taken and will branch back to the start of the loop as indicated by the arrow 490. This means that the current predict block that then needs to be considered is the predict block 495 whose start address is the start address of the loop. If the buffer storage contains the prediction information for the block 480, due to an access into the BTB being made during the previous iteration of the loop, it will be appreciated that the prediction information now required for the predict block 495 can be obtained from the buffer storage 60, and accordingly there is no need to access the BTB 20. Accordingly, the technique described earlier can give rise to significant power consumption savings when employed in association with small loops, where the required prediction information can be retained within the buffer storage 60.

From the above illustrated examples, it will be appreciated that the technique described herein can enable a significant reduction in the power consumption associated with accessing branch prediction structures such as a BTB, and hence reduce the overall power consumption associated with making branch predictions within a data processing apparatus.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a fetch queue to identify a sequence of instructions to be fetched for execution by execution circuitry; and
prediction circuitry to make predictions in respect of instruction flow changing instructions, and to control which instructions are identified in the fetch queue in dependence on the predictions;
wherein:
the prediction circuitry is arranged, during each prediction iteration, to make a prediction for a predict block comprising a sequence of M instruction addresses, in order to identify whether that predict block contains the instruction address for an instruction flow changing instruction that is predicted as taken;
during each prediction iteration, the prediction circuitry is arranged, in the absence of an override condition, to access a prediction storage in order to produce prediction information for instructions associated with a specified block of instruction addresses, where the specified block comprises at least the predict block being considered during that prediction iteration, and to use that prediction information to make the prediction for that predict block;
the apparatus further comprising:
buffer storage to retain the prediction information obtained from the prediction storage during one or more previous prediction iterations; and
detection circuitry to detect when a current predict block being considered during a current prediction iteration comprises one or more instruction addresses for which the associated prediction information is retained in the buffer storage, and in that event to trigger the override condition in order to cause the prediction information for those one or more instruction addresses to be obtained from the buffer storage rather than from the prediction storage.

2. An apparatus as claimed in claim 1, wherein in the presence of the override condition at least a portion of the prediction storage is deactivated during the current prediction iteration.

3. An apparatus as claimed in claim 1, wherein when the current predict block is entirely contained within a specified block of instruction addresses for which the associated prediction information is retained within the buffer storage, then the prediction circuitry is arranged to make the prediction for the current predict block without accessing the prediction storage.

4. An apparatus as claimed in claim 1, wherein the prediction storage is target prediction storage and the prediction information indicates a predicted target address for any instruction flow changing instructions that are associated with the specified block of instruction addresses.

5. An apparatus as claimed in claim 4, wherein the prediction information further identifies when an instruction flow changing instruction that is associated with the specified block of instruction addresses is conditionally executed.

6. An apparatus as claimed in claim 1, wherein when the current predict block is identified by a target address of an instruction flow changing instruction that was predicted to be taken, the detection circuitry is arranged to determine whether the target address resides within a specified block of instruction addresses for which the associated prediction information is retained within the buffer storage, and in that event to trigger the override condition.

7. An apparatus as claimed in claim 1, wherein the specified block of instruction addresses comprises a sequence of N aligned instruction addresses, where N is greater than M.

8. An apparatus as claimed in claim 7, wherein N is a multiple of M, the specified block of instruction addresses is composed of multiple sub-blocks, each sub-block comprising M aligned instruction addresses, and in the presence of the override condition, access to the prediction storage is suppressed for at least one of the sub-blocks.

9. An apparatus as claimed in claim 1, wherein the detection circuitry is arranged to trigger the override condition on detecting that the current predict block is identified by a return address of a function return instruction and the buffer storage retains the prediction information associated with a specified block of instruction addresses that includes the instruction address of an associated function call instruction.

10. An apparatus as claimed in claim 9, wherein the detection circuitry is arranged to suppress triggering the override condition when the instruction address of the associated function call instruction is a final instruction address in the specified block of instruction addresses.

11. An apparatus as claimed in claim 9, wherein the detection circuitry is arranged to determine that the buffer storage retains the prediction information associated with a specified block of instruction addresses that includes the instruction address of the associated function call instruction, based on knowledge about the function targeted by the associated function call instruction.

12. An apparatus as claimed in claim 11, wherein the detection circuitry is arranged to determine that the buffer storage retains the prediction information associated with a specified block of instruction addresses that includes the instruction address of the associated function call instruction, when the only instruction flow changing instruction in the function targeted by the associated function call instruction is the function return instruction and the number of instructions in the function does not exceed a threshold number.

13. An apparatus as claimed in claim 12, wherein the detection circuitry is arranged to reference the buffer storage to determine whether the only instruction flow changing instruction in the function targeted by the associated function call instruction is the function return instruction and the number of instructions in the function does not exceed a threshold number.

14. An apparatus as claimed in claim 12, wherein:
the prediction storage is target prediction storage used to identify target addresses for instruction flow changing instructions, the target prediction storage comprising a plurality of entries, where each entry is arranged to identify a source instruction flow changing instruction and associated target address information for that source instruction flow changing instruction;
the prediction storage is responsive to feedback from decode circuitry identifying that the only instruction flow changing instruction in the function targeted by the associated function call instruction is the function return instruction and the number of instructions in the function does not exceed a threshold number, to set a flag within the entry for the associated function call instruction;
wherein when during consideration of a given predict block during a given prediction iteration, the prediction circuitry predicts that a first taken instruction flow changing instruction in that given predict block is the associated function call instruction, the set flag is used to notify the detection circuitry that when the predict block identified by the return address of the function return instruction is considered during a subsequent prediction iteration the override condition is to be triggered.

15. An apparatus as claimed in claim 11, wherein:
the prediction storage is target prediction storage used to identify target addresses for instruction flow changing instructions, the target prediction storage comprising a plurality of entries, where each entry is arranged to identify a source instruction flow changing instruction and associated target address information for that source instruction flow changing instruction;
the target prediction storage comprises at least one entry that is configurable as a two-taken entry to indicate that the source instruction flow changing instruction identified by that entry is a function call instruction with an associated first target address that identifies a series of instructions that is expected to exhibit static behaviour and that terminates with an associated return instruction that is unconditionally taken;
wherein when during consideration of a given predict block during a given prediction iteration, the prediction circuitry predicts that a first taken instruction flow changing instruction in that given predict block is the function call instruction for which a two-taken entry is allocated, the detection circuitry is notified that when the predict block identified by the return address of the function return instruction is considered during a subsequent prediction iteration the override condition is to be triggered.

16. An apparatus as claimed in claim 6, wherein the instruction flow changing instruction is a branch instruction at an end of a loop, the target address is a first instruction in the loop, and the detection circuitry is arranged to trigger the override condition when the number of instructions in the loop does not exceed a threshold number.

17. A method of making predictions for instruction flow changing instructions, comprising:
identifying within a fetch queue a sequence of instructions to be fetched for execution by execution circuitry;
employing prediction circuitry to make predictions in respect of instruction flow changing instructions, and to control which instructions are identified in the fetch queue in dependence on the predictions;
during each prediction iteration, making a prediction for a predict block comprising a sequence of M instruction addresses, in order to identify whether that predict block contains the instruction address for an instruction flow changing instruction that is predicted as taken;
during each prediction iteration, in the absence of an override condition, accessing a prediction storage in order to produce prediction information for instructions associated with a specified block of instruction addresses, where the specified block comprises at least the predict block being considered during that prediction iteration, and using that prediction information to make the prediction for that predict block;

employing buffer storage to retain the prediction information obtained from the prediction storage during one or more previous prediction iterations; and detecting when a current predict block being considered during a current prediction iteration comprises one or more instruction addresses for which the associated prediction information is retained in the buffer storage, and in that event triggering the override condition in order to cause the prediction information for those one or more instruction addresses to be obtained from the buffer storage rather than from the prediction storage.

18. An apparatus comprising:

fetch queue means for identifying a sequence of instructions to be fetched for execution by execution circuitry; and prediction means for making predictions in respect of instruction flow changing instructions, and for controlling which instructions are identified in the fetch queue means in dependence on the predictions;

wherein:

the prediction means, during each prediction iteration, for making a prediction for a predict block comprising a sequence of M instruction addresses, in order to identify whether that predict block contains the instruction address for an instruction flow changing instruction that is predicted as taken;

during each prediction iteration, the prediction means, in the absence of an override condition, for accessing a prediction storage in order to produce prediction information for instructions associated with a specified block of instruction addresses, where the specified block comprises at least the predict block being considered during that prediction iteration, and for using that prediction information to make the prediction for that predict block;

the apparatus further comprising:

buffer means for retaining the prediction information obtained from the prediction storage during one or more previous prediction iterations; and detection means for detecting when a current predict block being considered during a current prediction iteration comprises one or more instruction addresses for which the associated prediction information is retained in the buffer means, and in that event for triggering the override condition in order to cause the prediction information for those one or more instruction addresses to be obtained from the buffer means rather than from the prediction storage.

* * * * *